W. A. STONE.
Corn-Sheller.
No. 219,123. Patented Sept. 2, 1879.
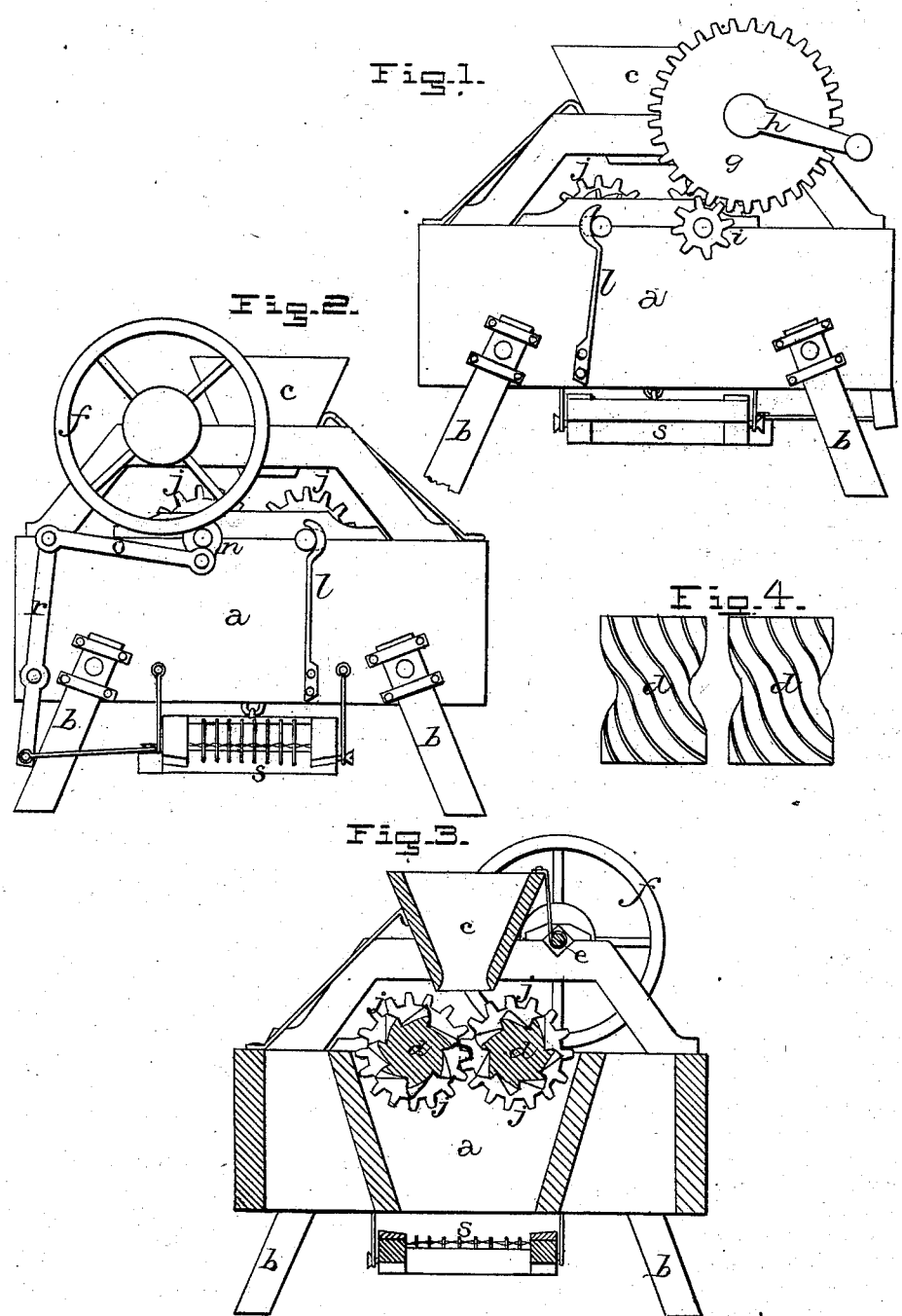

UNITED STATES PATENT OFFICE.

WILLIAM A. STONE, OF EDDYVILLE, ILLINOIS.

IMPROVEMENT IN CORN-SHELLERS.

Specification forming part of Letters Patent No. 219,123, dated September 2, 1879; application filed June 10, 1879.

*To all whom it may concern:*

Be it known that I, WILLIAM A. STONE, of Eddyville, in the county of Pope and State of Illinois, have invented certain new and useful Improvements in Corn-Shellers; and I do hereby declare the following to be a full, clear, and exact description of the invention, such as will enable others skilled in the art to which it pertains to make and use it, reference being had to the accompanying drawings, which form part of this specification.

My invention relates to an improvement in corn-shellers; and it consists in the arrangement and combination of devices that will be more fully described hereinafter, whereby the screen is connected to and made to vibrate by one of the shelling devices, so as to decrease the amount of power required to operate the machine, and to simplify its construction.

It still further consists in making the two shelling-rollers concave at their centers and fluted diagonally from end to end, and gearing them together so as to cause them to revolve toward each other.

Figures 1 and 2 are side elevations of my machine, taken from opposite sides. Fig. 3 is a vertical longitudinal section of the same. Fig. 4 is a plan view of the two shelling-cylinders.

$a$ represents a suitable rectangular frame, which is raised any suitable distance above the floor by the legs $b$. In the top of this frame is placed the hopper $c$, the lower end of which projects down just over the tops of the two shelling-cylinders $d$, which are journaled in the frame just under it. These two cylinders are made concave at their centers, so as to afford space for the ear of corn to pass through, and they are both fluted spirally from end to end, so as to shell the grains from the cob.

Upon the top of the frame is journaled the driving-shaft $e$, which has the fly-wheel $f$ on one end, and the large gear $g$ and crank $h$ on the other. This wheel $g$ meshes with a pinion, $i$, on one end of the shaft of one of the cylinders $d$, and as the two cylinders are geared together by the wheels $j$ they are both made to revolve together in the same direction.

Both cylinders have diagonal flutes made in their surfaces, which flutes are deeper at the ends than the center, so as to conform to the shape of the ears of corn passing through between them, and so as to more effectually shell the grains of corn from the cobs. One of these cylinders has its shaft made horizontally adjustable, and is pressed toward the other cylinder by means of the two springs $l$, so as to adapt itself to ears of varying size.

Upon the end of the shaft of the cylinder $d$ provided with the pinion $i$ is secured a crank, $n$, which has fastened to it the rod $o$, for connecting it to the upper end of the pivoted lever $r$. The lower end of this lever is connected to the screen $s$, and as the lever is rocked back and forth by the crank the screen is made to vibrate, so as to separate the corn from the cobs.

It will be seen that one of the cylinders is simply geared to the other cylinder so as to revolve with it, while the other cylinder serves not only to run both cylinders, but to operate the shaker also.

By this construction a simpler form of frame is required, fewer operating parts are needed; and less power is required to operate the machine.

Having thus described my invention, I claim—

In a corn-shelling device, the combination of two shelling-cylinders, made concave at their centers and fluted spirally, and made to revolve toward each other, substantially as set forth.

In testimony that I claim the foregoing I have hereunto set my hand this 2d day of June, 1879.

W. A. STONE.

Witnesses:
 CALVIN MAYNOR,
 SAM. S. BARGER.